United States Patent [19]

Hutcheson

[11] Patent Number: 5,082,115
[45] Date of Patent: Jan. 21, 1992

[54] MEAL CONTAINER

[76] Inventor: Steven R. Hutcheson, 69 Sturges Rd., Reading, Mass. 01867

[21] Appl. No.: 696,834

[22] Filed: May 7, 1991

[51] Int. Cl.$^5$ .............................................. B65D 81/18
[52] U.S. Cl. .................................... 206/545; 206/549; 206/553; 220/23.83
[58] Field of Search .......................... 206/541-551, 206/553; 220/4.27, 23.83, 521, 522, 212

[56] References Cited

U.S. PATENT DOCUMENTS

| | | | |
|---|---|---|---|
| 1,220,159 | 3/1917 | LaBadie et al. | 206/543 |
| 2,645,332 | 7/1953 | Martin et al. | 206/546 |
| 3,266,623 | 8/1966 | Poferl | 206/541 |
| 3,608,770 | 9/1971 | Naimoli | 206/550 |
| 3,744,663 | 7/1973 | Moren | 220/4.27 |
| 3,791,547 | 12/1974 | Branscum | 220/522 |
| 4,484,682 | 11/1984 | Crow | 206/541 |
| 4,667,484 | 5/1987 | Tarozzi et al. | 220/521 |
| 4,889,257 | 12/1989 | Steffes | 220/212 |

FOREIGN PATENT DOCUMENTS 2553386  4/1985  France ................... 220/522

Primary Examiner—Jimmy G. Foster
Attorney, Agent, or Firm—Edward A. Gordon

[57] ABSTRACT

The portable meal container includes a base member for containing food having a substantially rectangular bottom wall and four integral perpendicular side walls of equal height terminating in a unitary top rim and a detachable cover member having top and bottom surfaces adapted to form a tight seal with the top rim portion of the base member. The meal container includes a thermally insulated container member for receiving and disbursing liquid releasably attached to a portion of the top surface of the cover member and a compartment member for containing at least one eating utensil within the compartment member which is also attached to a portion of the top surface of the cover member. The utensil compartment member includes a cover detachable sealed to the upper surface of the compartment member for providing access to the compartment member and the utensils contained therein. In a preferred embodiment, the base member includes one or more vertical dividers so as to divide the base member into two or more spaces for separation of food or the like. Additionally in an alternate embodiment, the walls of the base and cover members are constructed and arranged to contain a thermal insulating material to provide a thermally insulated meal container.

19 Claims, 4 Drawing Sheets

MEAL CONTAINER

BACKGROUND OF THE INVENTION

1. Field Of The Invention

The present invention relates to food containers and more particularly to a new and improved container for meals adapted for carrying and dispensing solid foods, liquids and eating utensils.

2. Description Of The Prior Art

Containers for food and particularly such containers intended to be used as lunch boxes, kits or the like are well known. However, such known containers have inherent problems and difficulties well known to all who use them.

One disadvantage of prior art containers is that they do not provide a simple yet effective thermally insulated container for liquids. Another disadvantage of the present containers is that they do not include eating utensils or those that have utensils do not provide a suitable compartment with ease of access.

Another disadvantage of prior art devices is the lack of a container which is of simple construction, easily portable and which may be economically manufactured.

The following U.S. Patents are believed to exemplify the present state of the art with respect to portable lunch box like food containers:

|           |           |
|-----------|-----------|
| 1,573,620 | 1,839,414 |
| 3,266,623 | 3,610,409 |
| 3,842,975 | 3,945,496 |
| 4,499,998 | 4,930,637 |

While such prior art devices provide improvement in the areas intended, there still exists a need for a meal container device which overcomes the disadvantages of the prior art while providing utility features which provide new and useful advantages and improvements not heretofore disclosed.

Accordingly, a principle desirable object of the present invention is to provide a new and improved meal container device which overcomes the disadvantages of the prior art devices.

Another desirable object of the present invention is to provide a meal container which includes a removably mounted thermally insulated liquid container.

Another desirable object of the present invention is to provide a meal container having a thermally insulated base member to carry a full meal of different foods after the same have been prepared.

A still further desirable object of the present invention is to provide a meal container in which the base member is adapted to include dividers to divide the base into spaces to receive foods.

A still further desirable object of the present invention is to provide a meal container provided with a compartment for eating utensils positioned on the outer surface of the container cover and adapted for easy access to the utensils.

Another desirable object of the present invention is to provide a meal container which can be readily formed of plastic, metal or combinations thereof, or other low cost materials.

Another desirable object of the present invention is to provide a meal container in accordance with the foregoing desirable objects that is readily portable and which may be economically manufactured and be of durable character.

These and other desirable objects of the present invention will in part appear hereinafter and will in part become apparent after consideration of the specification with reference to the drawings and the claims.

SUMMARY OF THE INVENTION

Briefly stated, the present invention discloses a portable meal container which can be used by the general public for such purposes including picnics and student and worker box meals and lunches. The portable meal container of the present invention is also suitable for lunch or dinner packs which can be prepared and transported to elderly people, for example. The portable meal container of the present invention for foods, liquids, and utensils provides a base member for containing food and preferably having a substantially rectangular bottom wall and four integral perpendicular side walls of equal height terminating in a unitary top rim and a detachable cover member having top and bottom surfaces and adapted to form a tight seal with the top rim of the base member. The meal container includes a thermally insulated container member for receiving and disbursing liquid releasably attached to a portion of the top surface of the cover member and a compartment member for containing at least one eating utensil within the compartment member which is also attached to a portion of the top surface of the cover member. The utensil compartment member includes a cover detachably sealed to the upper surface of the compartment member for providing access to the compartment member and the utensils contained therein.

In a preferred embodiment, the base member includes one or more vertical dividers so as to divide the base member into two or more spaces for separation of food or the like. Additionally in an alternate embodiment, the walls of the base and cover members are constructed and arranged to contain a thermal insulating material to provide a thermally insulated meal container.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DETAILED DESCRIPTION OF PREFERRED EMBODIMENT(S)

Figure 1:
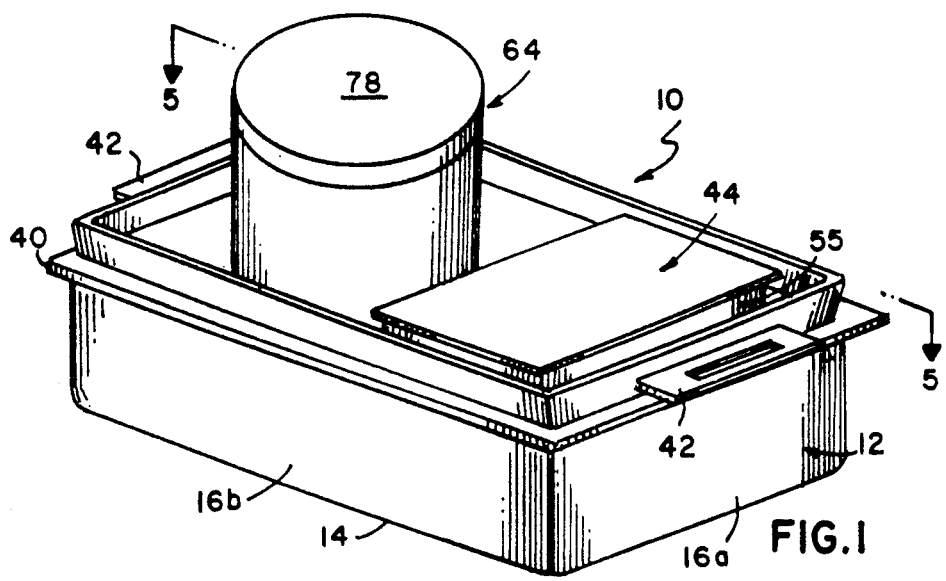
FIG. 1 is a perspective view of a preferred embodiment of a container incorporating the principle features of the present invention.

Referring now to the drawings, the portable meal container, illustrated generally by the numeral 10, comprises a base member 12 having a substantially rectangular bottom wall 14 and four integral perpendicular side walls 16 a–d.

The side walls 16 a–d extend upwardly to an equal height and terminate in a unitary top rim member 18 which defines the top open portion of the base member 12.

Figure 5:
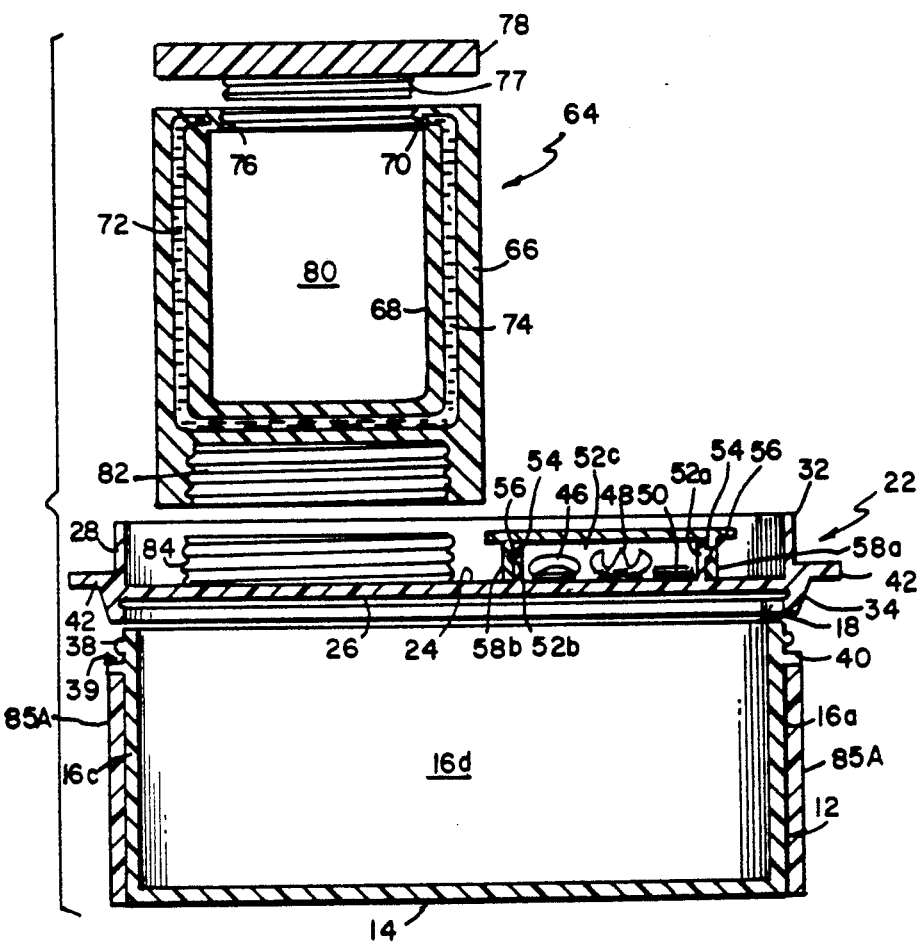
FIG. 5 is an exploded cross-sectional view taken along the line 5—5 of FIG. 1.
Figure 6:
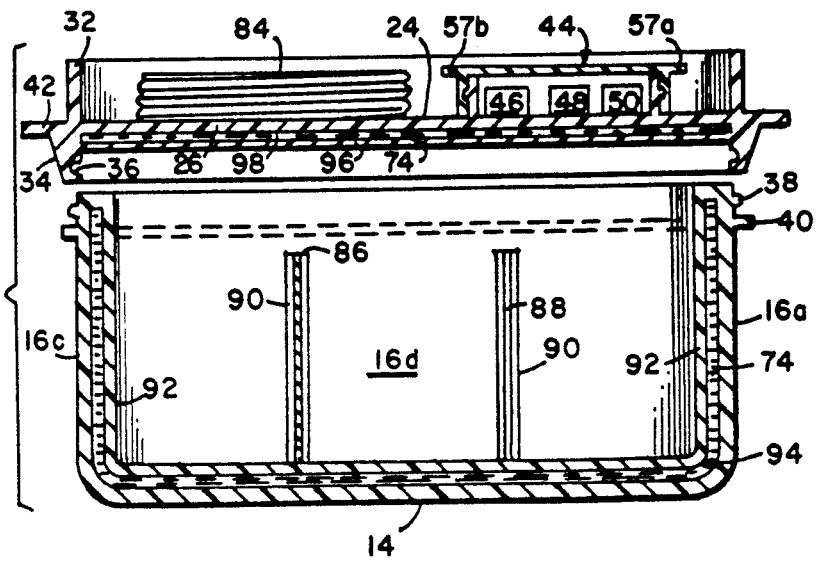
FIG. 6 is a cross-sectional view of an alternate embodiment of the cover and base members of a container incorporating the principle features of the present invention.

The cover member 22 is of rectangular configuration having a top surface 24 and a bottom surface 26. The cover member 22 includes a frame member 28 formed about the periphery 30 of the cover member 22 and provides an upper wall member 32 and a lower wall member 34. As best seen in FIGS. 5 and 6, the inner surface of the lower wall member 34 is provided with a groove 36 which is sufficiently flexible and configured to thereby releasably receive the flange member 38 disposed about the upper and outer surface 39 of the base member 12 and thereby serves to releasably seal the cover member 22 to the base member 12. It is to be understood that the cover seal can provide air and/or liquid tight sealing means. Also the base member 12 is provided with a rim member 40 which is disposed about the outer surface of the wall members 16 a–d and extends outwardly and horizontally below the flange member 38 at a sufficient distance so that the lower wall member 34 of the cover contacts the rim member when the cover member 22 is attached to the base member 12.

In a preferred embodiment, the cover member 22 is provided with opposing tab members 42 which facilitate removal of the cover member 22.

Figure 4:
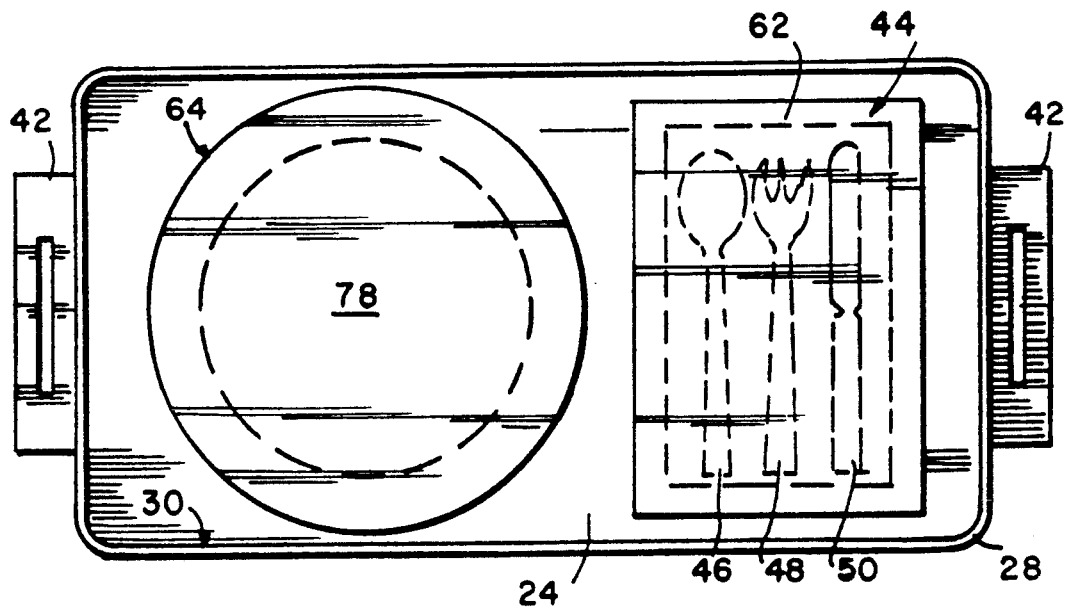
FIG. 4 is a top plan view of the container of FIG. 1.

A portion of the upper surface 24 of the cover member 22 includes a compartment housing 44 for containing utensils such as, for example, the spoon 46, fork 48 and knife 50, as best seen in phantom in FIG. 4.

Figure 2:
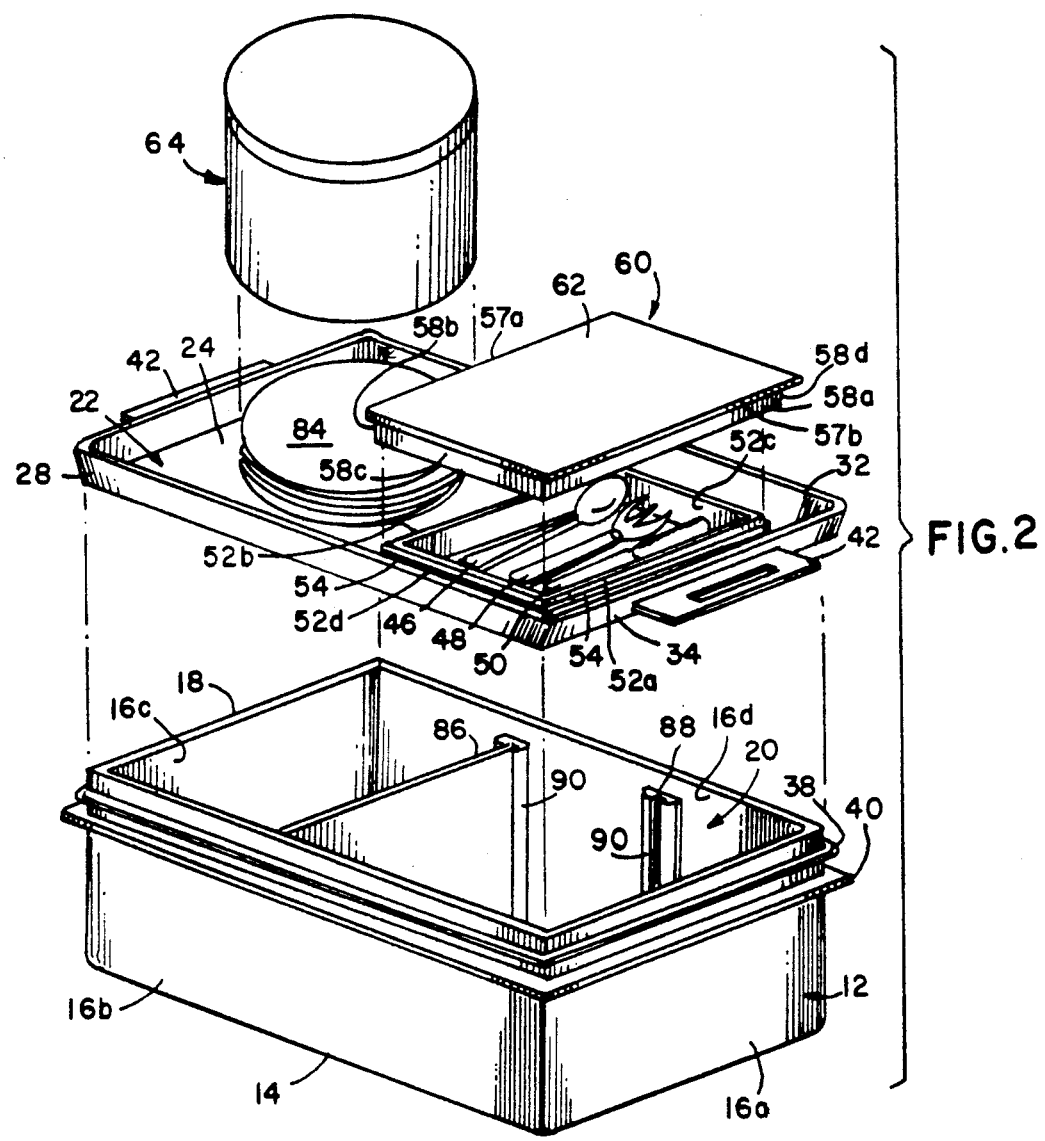
FIG. 2 is an exploded perspective view of the container of FIG. 1.

The utensil housing compartment illustrated generally by the numeral 44 comprises four mutually perpendicular side walls 52 a–d (as best seen in FIG. 2) extending upwardly from the top surface 24 of the cover member 22 and forming a generally rectangular housing base portion 53 to receive utensils. The outer surface of each of the elongated opposing side members 52a and 52b is provided with elongated flange members 54 which are configured to receive the opposing grooves 56 defined by the inner surface of the side walls 58a and 58b of the cover member indicated generally by the numeral 60 as best seen in FIG. 2. The cover member 60 also includes opposing end walls 58c and 58d and top member 62. In this manner the flanges 54 and grooves 56 permit the cover member 60 of the utensil compartment 44 to be releasably attached to the base portion walls indicated generally in FIG. 1 by the numeral 55. The cover member 62 is provided with elongated opposing flange edges 57a and 57b which extend beyond the respective walls 58a and 58b (as indicated in FIGS. 1 and 6) to facilitate manual removal of the cover member 60.

In the preferred embodiment, the liquid container as indicated generally by the numeral 64 is a thermally insulated container for liquids such as milk, water, fruit juices and cordials which can be chilled or frozen in the liquid container. The thermally insulated container indicated generally by the numeral 64 of the present invention, as best seen in FIG. 5 is formed of concentric outer and inner walls 66 and 68, respectively which are joined together at their upper extremity section 70 and define therebetween a fluid-tight chamber 72 which is preferably permanently filled with a thermal insulating material 74 that is preferably non-toxic and is, for example, a gel, foam, or liquid at room temperature and which can be cooled or frozen prior to use by simply placing the liquid container in a cooler or freezer such as, for example, a household refrigerator. While water can be used, the coolant material 74 is preferably that which absorbs more heat in melting than water. A coolant made up of about 85% water, 14% starch and 1% borax which takes the form of a gel would be satisfactory. Such gel refrigerants are described, for example, in U.S. Pat. Nos. 2,800,454 and, 2,800,455. Other freezable substances may be a water solution of glycerin or plastic gel such as BLUE ICE which can be readily frozen and which has the appropriate physical properties for use in this application. Other gel compositions may be used such as the gel composition disclosed in U.S. Pat. No. 4,462,224 in the fluid-tight chambers 72 and 72A of the liquid cup container 64 and/or the respective fluid-tight chambers 94 and 98 respectively of the base 12 and cover 22 members, as discussed hereinafter. Also the cup container 64 and/or the base and cover members 12 and 22 can be formed of a suitable plastic material such as polyethylene which can be subjected to heating by microwave energy.

Referring again more particularly to FIG. 5, the upper portion of the liquid container 64 sometimes herein referred to as a cup type container is provided with an inner threaded portion 76 to which the threaded neck portion 77 of cap member 78 is releasably screwed to seal the liquid material 80 within the container 64.

The outer wall member 66 of the liquid container 64 terminates at the lower portion with a lower inner threaded circular portion 82 which permits the liquid container 64 to be releasably screwed to the threaded neck portion 84 which is formed as part of or is attached to a portion of the upper surface 24 of the cover member 22.

Figure 3:
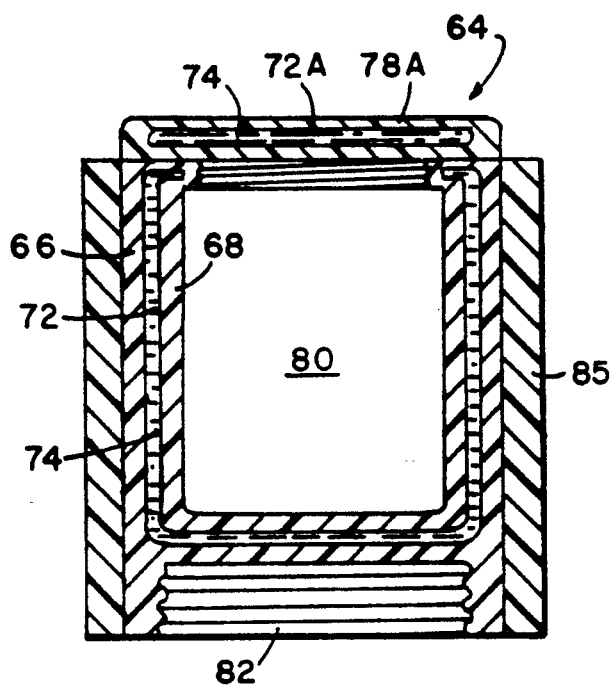
FIG. 3 is a cross-sectional view of the liquid container cup with a thermo-sleeve disposed about the outer vertical surface.

Referring now to FIG. 3, there is illustrated an alternate embodiment of the liquid container 64. As illustrated, the liquid container 64 is provided with a removable flexible sleeve member 85 which is formed of a thermal insulating material such as, for example, THERMALFLEX to prolong the selected temperature of the material 80 within the container 64. Also the cap 78A is illustrated in an alternate embodiment including a fluid tight chamber 72A which can also contain a thermally insulating material 74 such as gel or foam. In the same manner as illustrated with respect to the liquid container in FIG. 3, the base member 12, as shown in FIG. 5, may also be provided with a removable flexible sleeve member 85A which is also formed of a thermal insulating material, such as, for example, THERMALFLEX to prolong the selected temperature of the interior 21 of the base member 12.

Referring now more particularly to FIGS. 2 and 6, there is illustrated in the preferred embodiment a space divider means for the base member 12 which includes one or more generally planar dividers 86 which are slidable into the grooves 88 defined by the vertical support members 90 positioned, for example, on opposing side walls 16b and 16d as illustrated. In the embodiment illustrated, one or two dividers 86 can be placed in the grooves 88 to divide the base 12 into two or three distinct spaces for storage of food or the like. Alternatively, the dividers can be omitted to provide a larger space.

Referring now more particularly to FIG. 6, there is illustrated an alternate embodiment for the base member 12 and the cover member 22. In this embodiment, the base member 12 is provided with an inner wall member 92 which is in spaced relationship from the outer wall portions 16 a-d and 14 and seal together to form a fluid-tight chamber 94 which can also contain a thermally insulating material 74 such as liquid gel or foam. Similarly, the cover member 22 is provided with an inner wall member 96 which is in spaced relationship from the bottom surface 24 of the cover member 22 and sealed together to form a fluid-tight chamber 98 which also contains a thermally insulating material 74.

Figure 7:
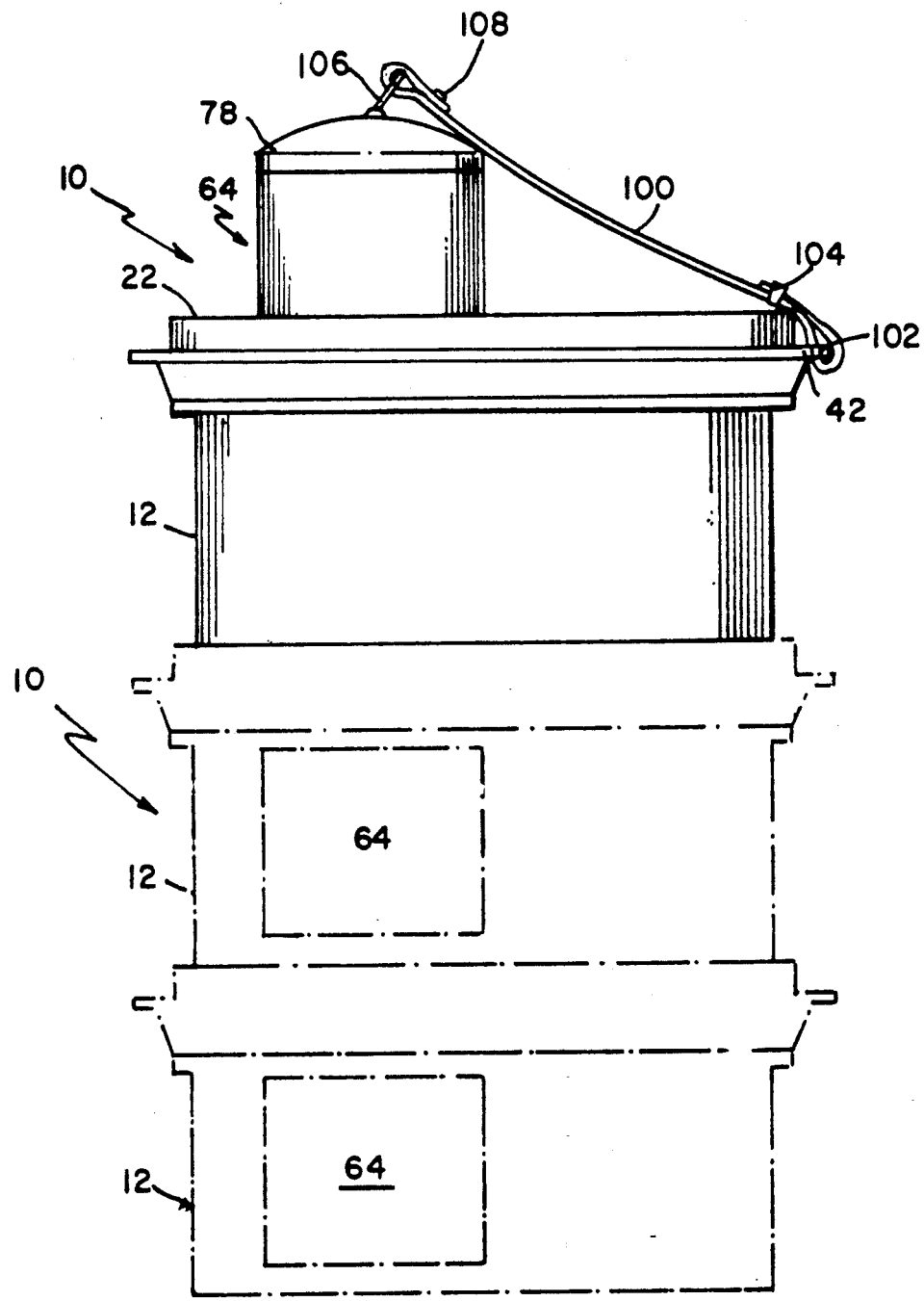
FIG. 7 is a side elevational view of another embodiment of the present invention also including a stacking feature.

Referring now to FIG. 7, there is illustrated an alternate embodiment of the meal container 10 including a carrying means illustrated as a strap member 100 in which one end is passed through a slot 102 defined by the tab member 42 which is farthest away from the liquid container 64 and attached by conventional buckle means 104. The cap member 78 is provided with attaching means 106 illustrated as a ring member through which the strap member passes and is releasably sealed to a portion of the strap member 100 by a conventional snap button 108.

Also illustrated in FIG. 7 is an example of the stacking feature of the meal container 10. As shown, the liquid container 64 may be formed of a size sufficient to fit within the base member so that the containers 10 can be stacked when not in use upon each other. When stacking is for sales purposes the top container 10 can retain the liquid container 64 in the attached position on the cover 22.

While the portable meal container of the present invention is preferably formed of a plastic material such as polyethylene, it can be made of various materials or combinations thereof such as metals (stainless steel, for example) or plastic material (such as polyethylene) which can be used to mold the pieces and members of the container.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A portable meal container for foods, liquids, and utensils comprising:
   a base member for containing food having a substantially rectangular bottom wall and four integral perpendicular side walls of equal height terminating in a unitary top rim;
   a detachable cover means having top and bottom surfaces and adapted to form a tight seal with the top rim of the base member;
   a liquid container means for receiving and disbursing liquid;
   means for releasably attaching the liquid container means to the top surface of the detachable cover means comprising a threaded neck section extending upwardly from a portion of the top surface of the detachable cover means and a conforming inner threaded neck section positioned on the bottom surface of the liquid container means whereby the liquid container means is releasably screwed to the threaded neck section of the detachable cover means; and
   a compartment means for containing at least one eating utensil within the compartment means;
   said compartment means being attached to a portion of the top surface of the cover member.

2. The portable meal container according to claim 1 wherein the compartment means for containing at least one eating utensil includes a cover means detachably sealed to the upper portion of the compartment means for providing access to the compartment means.

3. The portable meal container according to claim 1 comprising more than one eating utensil contained within the compartment means for containing utensils.

4. The portable meal container according to claim 1 wherein the liquid container means is thermally insulated.

5. The portable meal container according to claim 1 wherein the base member and detachable cover means are thermally insulated.

6. The portable meal container according to claim 1 further including a generally planar divider means for dividing the base member into at least two spaces for separate storage of selected foods.

7. The portable meal container according to claim 1 formed of a plastic material.

8. A portable meal container for foods, liquids, and utensils comprising:
   a base member for containing food having a substantially rectangular bottom wall and four integral perpendicular side walls of equal height terminating in a unitary top rim;
   a detachable cover means having top and bottom surfaces and adapted to form a tight seal with the top rim of the base member;
   a liquid container means for receiving and disbursing liquid;
   means for releasably attaching the liquid container means to the top surface of the detachable cover means comprising a threaded neck section extending upwardly from a portion of the top surface of the deteachable cover means and a conforming inner threaded neck section positioned on the bottom surface of the liquid container means whereby the liquid container means is releasably screwed to the threaded neck section of the detachable cover means;
   a compartment means for releasably containing at least one eating utensil within the compartment means;
   said compartment means being attached to a portion of the top surface of the cover member;
   a generally perpendicular planar divider means for dividing the base member into at least two spaces for separate storage of selected foods; and
   a handle means for carrying said portable meal container removably coupled to the liquid container means and a remote end of the detachable cover means.

9. A portable meal container for foods, liquids, and utensils comprising:
   a base means dimensioned for containing food comprising inner and outer spaced wall members joined together at their upper extremities to form a fluid-tight chamber therebetween to contain a selected thermal insulating material;

a cover means comprising upper and lower spaced wall members joined together about their peripheral edges to form a fluid-tight chamber therebetween to contain a selected thermally insulating material;

attaching means for releasably attaching the cover means to said base means;

a liquid container means dimensioned for receiving and dispersing liquid;

means for releasably attaching the liquid container means to the upper spaced wall member of the cover means comprising a threaded neck section extending upwardly from a portion of the upper wall member of the cover means and a conforming inner threaded neck section positioned on the bottom surface of the liquid container means whereby the liquid container means is releasably screwed to the threaded neck section of the upper wall member of the cover means; and a compartment means for containing at least one eating utensil;

said compartment means being attached to a portion of the surface of the upper wall member of said cover means.

10. The portable meal container according to claim 9 formed of a plastic material.

11. The portable meal container according to claim 9 wherein the thermally insulating material for the base means and cover means is a thermal gel.

12. The portable meal container according to claim 9 wherein the thermally insulating material for the base means and cover means is a thermal fluid.

13. The portable meal container according to claim 9 wherein the thermally insulating material for the base means and cover means is a thermal foam.

14. The portable meal container according to claim 9 further including a generally planar divider means for dividing the base member into at least two spaces for separate storage of selected foods.

15. A portable meal container for foods, liquids, and utensils comprising:

a base member for containing food having a substantially rectangular bottom wall and four integral perpendicular side walls of equal height terminating in a unitary top rim;

a detachable cover means having top and bottom surfaces and adapted to form a tight seal with the top rim of the base member;

a liquid container means for receiving and disbursing liquid;

means for releasably attaching the liquid container means to a portion of the top surface of the cover member;

a compartment means for containing at least one eating utensil within the compartment means;

said compartment means being attached to a portion of the top surface of the cover member; and a handle means for carrying said portable meal container removably coupled to the liquid container means and a remote end of the detachable cover means.

16. The portable meal container according to claim 15 wherein the handle means comprises a flexible strap member.

17. A portable meal container for foods, liquids, and utensils comprising:

a base member for containing food having a substantially rectangular bottom wall and four integral perpendicular side walls of equal height terminating in a unitary top rim;

a detachable cover means having top and bottom surfaces and adapted to form a tight seal with the top rim of the base member;

a liquid container means for receiving and disbursing liquid;

means for releasably attaching the liquid container means to the top surface of the detachable cover means comprising a threaded neck section extending upwardly from a portion of the top surface of the detachable cover means and a conforming inner threaded neck section positioned on the bottom surface of the liquid container means whereby the liquid container means is releasably screwed to the threaded neck section of the detachable cover means;

said liquid container means including a removable sleeve member disposed about the liquid container means and formed of a thermal insulating material; and a compartment means for containing at least one eating utensil within the compartment means;

said compartment means being attached to a portion of the top surface of the detachable cover means.

18. A portable meal container for foods, liquids, and utensils comprising:

a base member for containing food having a substantially rectangular bottom wall and four integral perpendicular side walls of equal height terminating in a unitary top rim;

said base member including a removable sleeve member disposed about the base member; said sleeve member being formed of a thermal insulating material;

a detachable cover means having top and bottom surfaces and adapted to form a tight seal with the top rim of the base member;

a liquid container means for receiving and disbursing liquid;

means for releasably attaching the liquid container means to the top surface of the detachable cover means comprising a threaded neck section extending upwardly from a portion of the top surface of the detachable cover means and a conforming inner threaded neck section positioned on the bottom surface of the liquid container means whereby the liquid container means is releasably screwed to the threaded neck section of the detachable cover means; and a compartment means for containing at least one eating utensil within the compartment means;

said compartment means being attached to a portion of the top surface of the detachable cover means.

19. A portable meal container for foods, liquids, and utensils comprising:

a base member for containing food having a substantially rectangular bottom wall and four integral perpendicular side walls of equal height terminating in a unitary top rim;

said base member including a removable sleeve member disposed about the base member; said sleeve member being formed of a thermal insulating material;

a detachable cover means having top and bottom surfaces and adapted to form a tight seal with the top rim of the base member;

a liquid container means for receiving and disbursing liquid;

means for releasably attaching the liquid container means to the top surface of the detachable cover means and a conforming inner threaded neck section positioned on the bottom surface of the liquid container means whereby the liquid container means is releasably screwed to the threaded neck section of the detachable cover means;

said liquid container means including a removable sleeve member disposed about the liquid container means and formed of a thermal insulating material; and a compartment means for containing at least one eating utensil within the compartment means;

said compartment means being attached to a portion of the top surface of the detachable cover means.

* * * * *